(12) United States Patent
Magrin et al.

(10) Patent No.: US 8,690,965 B2
(45) Date of Patent: Apr. 8, 2014

(54) PAPER FINISHING PROCESS

(75) Inventors: Armando Magrin, Arzignano (IT); Andrea Pellizzari, Arzignano (IT)

(73) Assignee: G & G S.r.L. (Societa Unipersonale), Arzignano (VI) (IT)

( * ) Notice: Subject to any disclaimer, the term of this patent is extended or adjusted under 35 U.S.C. 154(b) by 68 days.

(21) Appl. No.: 13/521,554

(22) PCT Filed: Jan. 11, 2011

(86) PCT No.: PCT/EP2011/050259
§ 371 (c)(1),
(2), (4) Date: Jul. 11, 2012

(87) PCT Pub. No.: WO2011/086057
PCT Pub. Date: Jul. 21, 2011

(65) Prior Publication Data
US 2012/0284933 A1    Nov. 15, 2012

(30) Foreign Application Priority Data
Jan. 13, 2010   (IT) .............................. MI2010A0024

(51) Int. Cl.
*D06P 3/32*    (2006.01)

(52) U.S. Cl.
USPC .................................................. 8/436; 8/445

(58) Field of Classification Search
USPC ...................................................... 8/436, 445
See application file for complete search history.

(56) References Cited

FOREIGN PATENT DOCUMENTS

| DE | 2806259 | 8/1979 | |
|---|---|---|---|
| DE | 202006012870 | 11/2006 | |
| GB | 2189 191 A | * 10/1987 | ................ B32B 9/02 |
| WO | 95/10633 | 4/1995 | |

* cited by examiner

*Primary Examiner* — Eisa Elhilo
(74) *Attorney, Agent, or Firm* — Jacobson Holman PLLC

(57) ABSTRACT

A process for applying a finishing paper material on a leather or woven support material is described, comprising the steps of: first buttering of glue on a surface of the support material, positioning the finishing material on said support material, ironing, perching, second buttering of glue, and a finishing step.

11 Claims, 2 Drawing Sheets

PAPER FINISHING PROCESS

This is a national stage of PCT/EP11/050,259 filed Jan. 11, 2011 and published in English, which has a priority of Italian no. MI 2010 A 000024 filed Jan. 13, 2010, hereby incorporated by reference.

The present invention relates to a process for obtaining a particular finishing of leather and fabrics by coupling them with sheets of paper, such as for example sheets of newspaper, strip cartoons or the like.

Processes which allow fabric or leather sheets to be reciprocally coupled with sheets of material of other type have already been proposed, which in fact consist in buttering a glue on a fabric or leather, where sheets of paper will then be placed, for example.

However, these methods have the drawback that, after a little time, the paper layer has the natural tendency to wrinkle or get damaged, and the aesthetical effect obtained by its application is thus lost.

It is desirable to obtain a process which leads to the production of a sheet of composite material, consisting of a first support material, such as for example leather or non-woven fabric (NWF), coupled with a sheet of a second finishing material, e.g. paper, for the purpose of modifying the aspect thereof, i.e. the superficial features, the sheet produced not having the above-described drawbacks.

It is the main object of the present invention to provide a process for obtaining a sheet consisting of layers of materials different from one another, the aspect of which corresponds to that of a material used for finishing, with a preferred colouring if desired.

It is another object of the present invention to provide a process for obtaining a sheet consisting of layers of materials different from one another, which stands out for its good wear resistance and water impermeability.

It is a further object of the present invention to provide a process for obtaining a sheet consisting of layers of materials different from one another, which is simple to be applied and cost-effective to be manufactured.

In accordance with the invention, these objects are achieved by a process for applying a finishing paper material on a leather or fabric support material, characterized in that it comprises the steps of:
first buttering of glue on a surface of the support material;
positioning the finishing material on said support material;
ironing;
perching;
second buttering of glue, and
a finishing step.

These and other features of the present invention will become more apparent from the following detailed description of a practical embodiment thereof, disclosed by way of non-limiting example in the accompanying drawings, in which.

Figure 1:
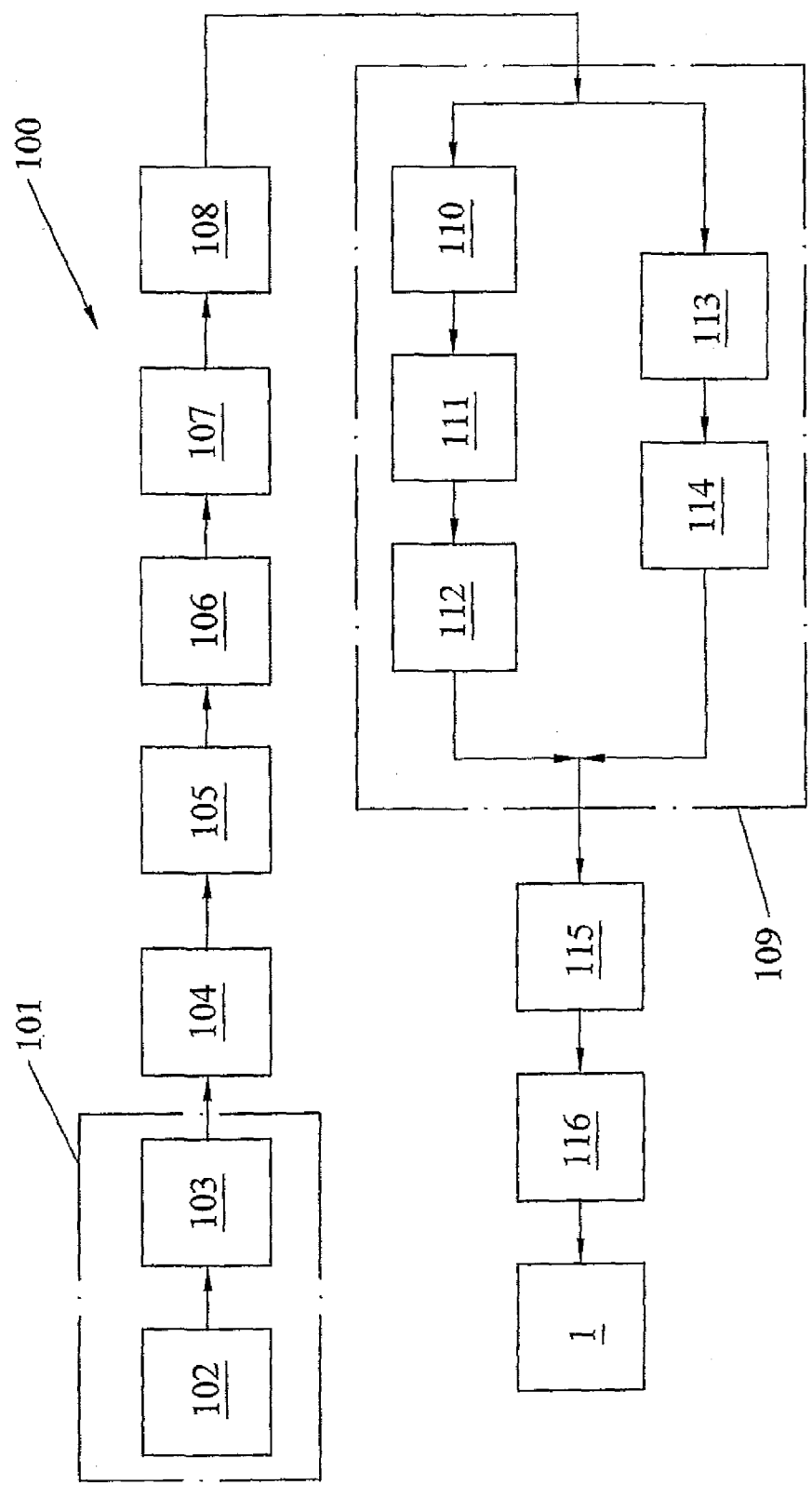
FIG. 1 shows a block diagram of the process according to the present invention.
Figure 2:
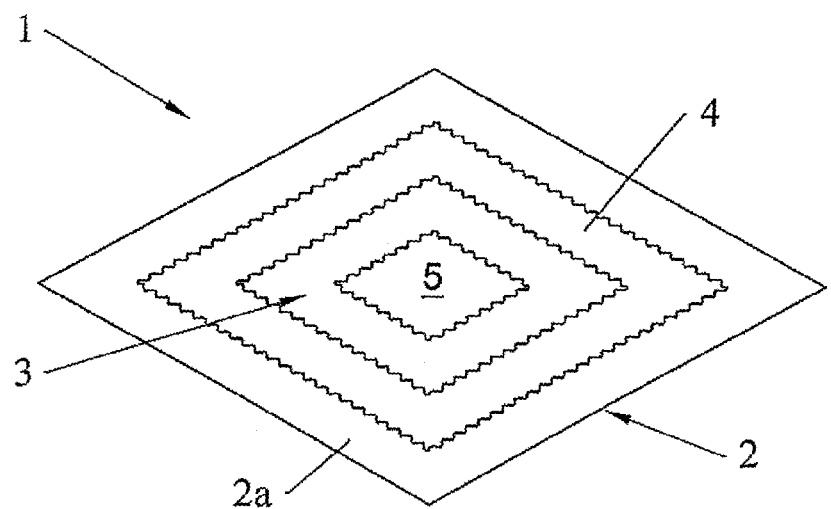
FIG. 2 shows a perspective view of a sheet consisting of a leather layer finished with a paper layer, obtained by means of the process in FIG. 1.
Figure 3:
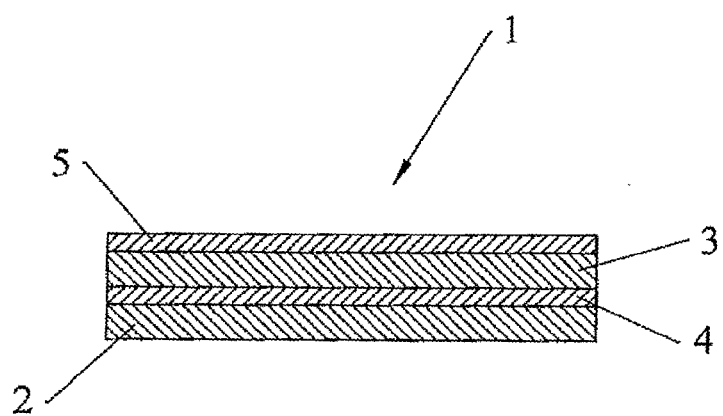
FIG. 3 shows a vertical section view of the sheet in FIG. 2.

With reference to the above-listed figures, it will be noted how the process 100 is intended to provide a flexible sheet 1 consisting of layers of materials different from one another.

Process 100 comprises a first coupling step 101, during which a second finishing material 3 is glued to a support material 2. The support material 2 will preferably consist of leather or microfibre processed as non-woven fabric, while the finishing material 3 will consist of daily newspaper paper, i.e. coated newspaper paper, more generally paper and the by-products thereof. In the embodiment described herein, the support material may be 1.5-2 $m^2$ sized and 0.7 mm thick, which may confer excellent features to the final product. The coupling step 101 will consist in a first step 102 of buttering a layer of water-based glue 4 onto surface 2a of the support material 2, and in a second step 103 during which material 3 will be applied to the same surface 2a while ensuring its fastening with dots of aliphatic, monocomponent thermoadhesive glue, for example, if desired. Glue 4 may be an aliphatic, monocomponent thermo-adhesive in aqueous dispersion, if desired, with a grammage of about 9 g per square foot and dry residue of 5 g. More precisely, glue 4 will not contain any substances deemed hazardous for the health of people and animals, and may be an aliphatic polyurethane Finish in aqueous emulsion with the features listed below:

| PHYSICAL STATE | VISCOUS LIQUID |
|---|---|
| COLOUR | MILKY |
| ODOUR | TYPICAL |
| pH | 7.0-8.0 |
| BOILING POINT | 100° C. |
| VAPOUR PRESSURE | (mmHg) .17.49 at 20° C. |
| SOLUBILITY | WATER DISPERSIBLE |
| VISCOSITY | 1300-1800 mPa. |
| VOC (Dir. 1999/13/EC) | 0.03% (mixture) |
| VOC (Volatile carbon) | 0.01% (mixture) |

Once coupling 101 has been completed, an ironing step 105 will follow, which will lead to the complete fixing of the finishing material 3 to the support material 2.

Ironing step 105 will be preferably preceded by a step 104 of drawing up a protective film 5, preferably of silicone type, on the finishing material 3, and it will be obtained by using a rotative heat press preferably at a temperature of 130° C., which ensures the fusible printing without bringing glue 4 to the boiling temperature, and by exerting a pressure of 60 bar, to obtain a good fusible printing without deteriorating sheet 1. If the protective film 5 is applied during step 104, once the ironing step 105 has been performed, it will be naturally removed during step 106.

Once the coupling of the support material 2 with the finishing material 3 has been obtained, through steps from 102 to 106, the semi-finished product obtained may undergo a perching (leather hammering) step 107 which, as known, allows it to become soft and flexible in all its areas.

Following the perching step 107, a second step 108 of (manually) buttering glue 4 is carried out as in step 102, and then the finishing 109 of the semi-finished product obtained at this point is performed.

The finishing step 109 will preferably comprise three steps 110, 111 and 112 entirely similar to steps 104, 105 and 106, respectively, which will confer a certain protection against wear, as well as pleasantness to the touch, in addition to further fixing the finishing material 3 to the support material 2.

Alternatively, the finishing step 109 may advantageously comprise a step 113 of applying a film 5, preferably a clear, lightweight polyurethane film of Nappalan 87/AG type, and an ironing step 114, similar to step 102, which will result in finishing 109 while preserving the original colours and providing the semi-finished product with softness to the touch and a natural look. If film 5 consists of a polyurethane (PU) composite film, it may be lightweight, easy to be used, without solvents and water, paintable, usable as a filler and ready to be used; the latter may be applied by means of a rotative press, at a temperature of 130° C., at a speed of 4 m/min. and at a pressure of 50 atmospheres. In this last case, film 5 may include a protective carrier (service means) on the side to be glued, which is to be eliminated before coupling, and a second carrier to be removed only after cooling.

Upon the finishing step 109, a tumbling step 115 will be carried out which, as known, may confer a wrinkled or aged effect to the tumbled product. The duration of this last step 115 may be prolonged over a time of two hours, if desired.

At the end of the process 100 according to the present invention, a last step 116 of colour plugging may be performed, the colour preferably being of the water-based aniline type, so that the finished product 1 takes the desired colour, thus conferring a vintage effect thereto. The colour used in step 116 may preferably be of the water-based aniline type.

By means of the above-described process 100, sheets 1 are thus obtained, consisting of a first support material 2, in leather or microfibre if desired, finished on a surface 2a by applying a finishing material 3. By virtue of process 100, the materials 2 and 3 become one, and moreover finishing layer 3 has, in some ways, the aspect of whatever newspaper, daily or weekly paper, while in other ways, it has the physical features usually not belonging to paper: indeed, after the application of method 100, the finishing layer 3 will be highly resistant to scratches and wear, as well as impermeable to liquids. For these reasons, process 100 leads to obtaining a product 1 which is ideally applied in making clothing accessories such as bags, belts, wallets and leather goods, in addition to making jackets or raincoats.

In practice, any materials as well as any size may be used as required.

The invention claimed is:

1. A process for applying a finishing paper material on a leather or woven support material, wherein it comprises the steps of:
   a. first buttering of glue on a surface of the support material;
   b. positioning of the finishing material on that support material;
   c. ironing;
   d. perching,
   e. second buttering of glue, and
   f. finishing step.

2. The process according to claim 1, wherein said finishing step comprises the steps of:
   g. drawing up of a protective film on said finishing material,
   h. ironing, and
   i. a step of removal of said protective film.

3. The process according to claim 1, wherein said finishing step comprises:
   j. a drawing up step of a poliuretanic film, and
   k. an ironing step.

4. The process according to claim 1, wherein said ironing step is preceded by a drawing up step of a protective film on said finishing material, and it is followed by a removal phase of said protective film.

5. The process according to claim 1, characterized in that said support material is made of microfibre.

6. The process according to claim 1, wherein it comprises a tumbling step following the finishing step.

7. The process according to claim 6, wherein it comprises a colouring step following the tumbling step.

8. The process according to claim 7, wherein said colouring step comprises colour plugging.

9. The process according to claim 8, wherein said colour used in the colouring step is of the water based aniline kind.

10. The process according to claim 1, wherein said glue is of the water dispersion aliphatic monocomponent thermoadhesive kind.

11. The process according to claim 1, wherein said ironing is due with silicon protection film rotative press at a temperature of 130° C. and a pressure of about 60 bar.

* * * * *